M. L. BEUGLESS.
BOILER COVER.
APPLICATION FILED FEB. 28, 1914.
1,121,893.
Patented Dec. 22, 1914.
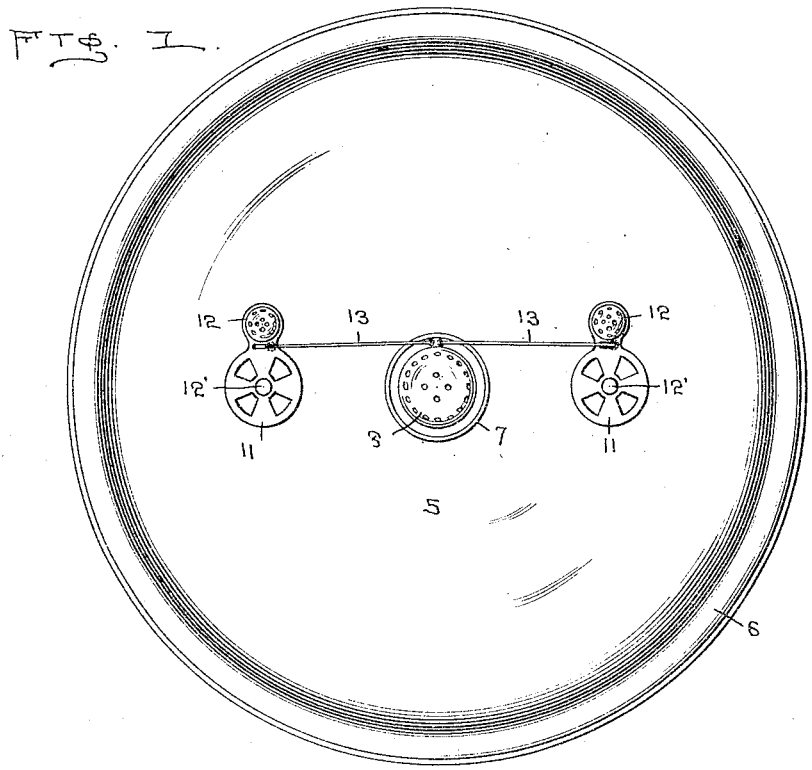
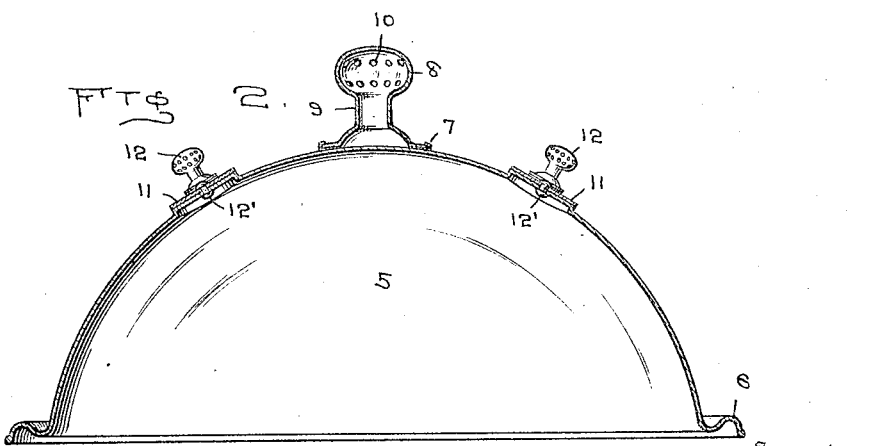
Witnesses
Inventor
M. L. Beugless

UNITED STATES PATENT OFFICE.

MARY L. BEUGLESS, OF BURLINGTON, NEW JERSEY.

BOILER-COVER.

1,121,893.     Specification of Letters Patent.     Patented Dec. 22, 1914.

Application filed February 28, 1914. Serial No. 821,766.

*To all whom it may concern:*

Be it known that I, MARY L. BEUGLESS, a citizen of the United States, residing at Burlington, in the county of Burlington and State of New Jersey, have invented certain new and useful Improvements in Boiler-Covers; and I do hereby declare the following to be a full, clear, and exact description of the invention, such as will enable others skilled in the art to which it appertains to make and use the same.

This invention relates to covers for cooking utensils and relates more specifically to that character of cover equipped with valves for permitting the superfluous steam to exhaust from the utensil.

The invention has for its object, among others, to provide a cover with a novel form of ventilated handle or knob adapted to permit a free circulation of air therethrough to prevent the same from becoming so hot as to burn the hand of the operator.

The invention has for a further object to provide a cover of such construction as to permit the contents of the utensil to expand without danger of unseating the cover.

With these objects in view, the invention consists in the improved construction, arrangement and combination of parts of a device of the character specified which will be hereinafter fully described and afterward specifically claimed.

In order that the construction and operation thereof may be readily comprehended, I will now proceed to fully describe my invention in connection with the accompanying drawings, which illustrate an approved embodiment thereof and in which drawings, Figure 1, represents a top plan view of the cover, and, Fig. 2 represents a vertical sectional view therethrough.

Referring to the drawings in detail wherein similar reference numerals designate corresponding parts throughout the several views, the numeral 5 indicates the cover which is preferably dome or semi-spherical shaped as illustrated in Fig. 2 having the lower edge turned upwardly thence downwardly to provide an inverted U-shaped annular flange 6.

While I have herein shown the general outline of the cover to be circular, it will be understood that I reserve the right to modify the shape or general outline of the cover to conform to the various types of cooking utensils now in general use.

The uppermost portion of the cover 5 is preferably flattened slightly and secured by solder or equivalent means to an inturned flange 7 in which is rotatably mounted the base of the handle or knob 8 having an intermediate reduced portion or neck 9. The portion of the cover 5 under the base of the knob 8 is formed imperforate, while the knob is hollow and formed with a plurality of apertures 10 adapted to admit free circulation of air therethrough for the obvious purpose of preventing overheating thereof. The cover 5 is also preferably flattened at one or more other points removed from the flattened upper portion thereof, and these parts are formed with apertures adapted to coöperate with the circular valves 11 having suitable apertures therein adapted to be moved into registration with the apertures in said cover to permit the superfluous steam to escape from the utensil. The valves 11 are rotatably secured in position upon the cover 5 by suitable rivets 12′ and are formed with lateral extensions to which are secured knobs 12 by means of which said valves may be adjusted. The knobs 12 are formed with a plurality of apertures similar to the knob 8. The base of the knob 8 and the portions of the valves 11 intermediate the latter and the lateral extensions thereof are formed with apertures in which are engaged the operating rods or levers 13 operatively connecting the knob 8 to the valves whereby when the former is rotated in the proper direction and to the proper extent the valves 11 are moved to either open or closed position as desired.

While I have specifically disclosed the exact construction and arrangement of the component parts of my invention, it will be obvious to those skilled in the art to which the invention most closely appertains, that changes and variations may be made therein within reasonable limitations without departing from the spirit and scope of the invention.

Having thus fully described my invention what I claim as new, and desire to secure by Letters Patent of the United States is:—

A utensil cover having a centrally disposed rotatable handle and apertures on each side of said handle; valves rotatably mounted over said apertures having handles attached thereto; rods pivotally connecting the said valves with the centrally disposed handle, whereby the said valves may be opened or closed simultaneously by actuating any one of the said handles.

In testimony whereof I have signed my name to this specification in the presence of two subscribing witnesses.

MISS MARY L. BEUGLESS.

Witnesses:
CHAS S. KING,
ANNA E. SHARP.

Copies of this patent may be obtained for five cents each, by addressing the "Commissioner of Patents, Washington, D. C."